Figure 1:
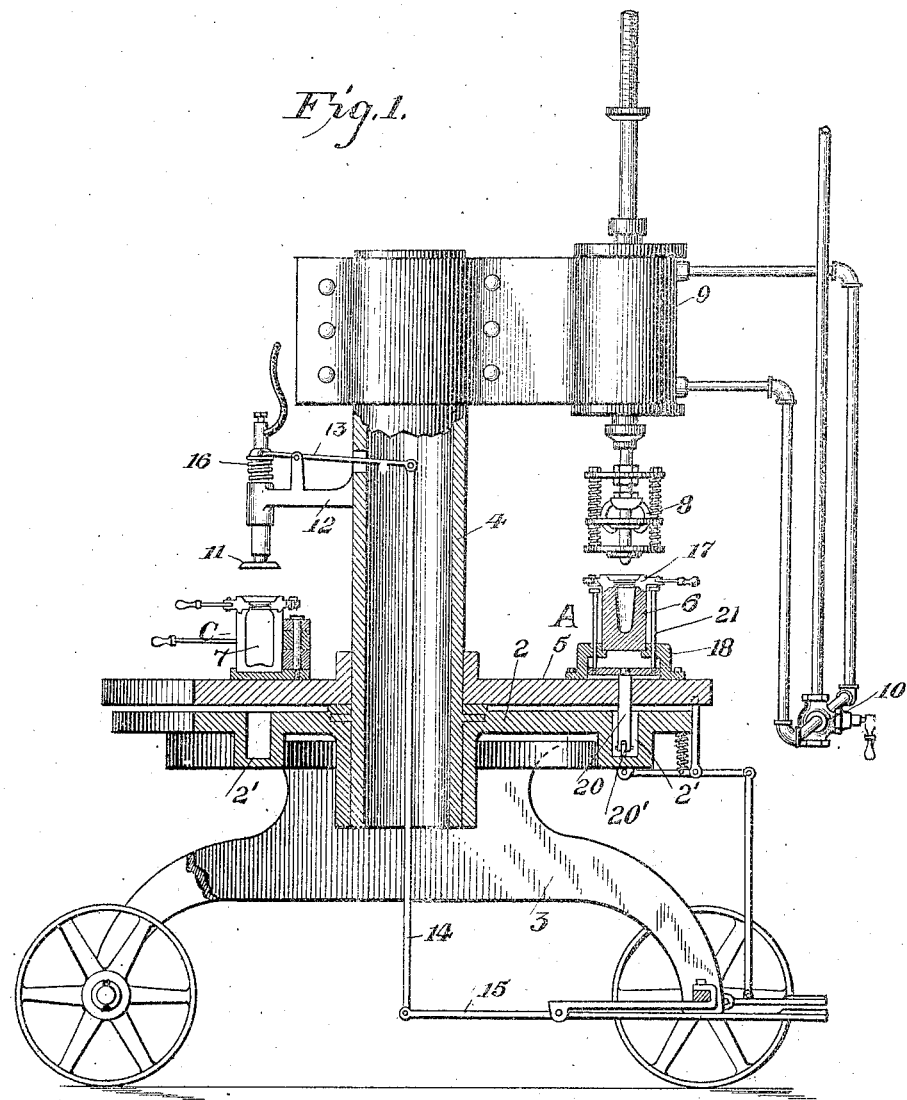

No. 822,623. PATENTED JUNE 5, 1906.
T. J. McELHERRON.
APPARATUS FOR MANUFACTURING GLASSWARE.
APPLICATION FILED APR. 24, 1905.

2 SHEETS—SHEET 1.

WITNESSES

INVENTOR

No. 822,623. PATENTED JUNE 5, 1906.
T. J. McELHERRON.
APPARATUS FOR MANUFACTURING GLASSWARE.
APPLICATION FILED APR. 24, 1905.
2 SHEETS—SHEET 2.
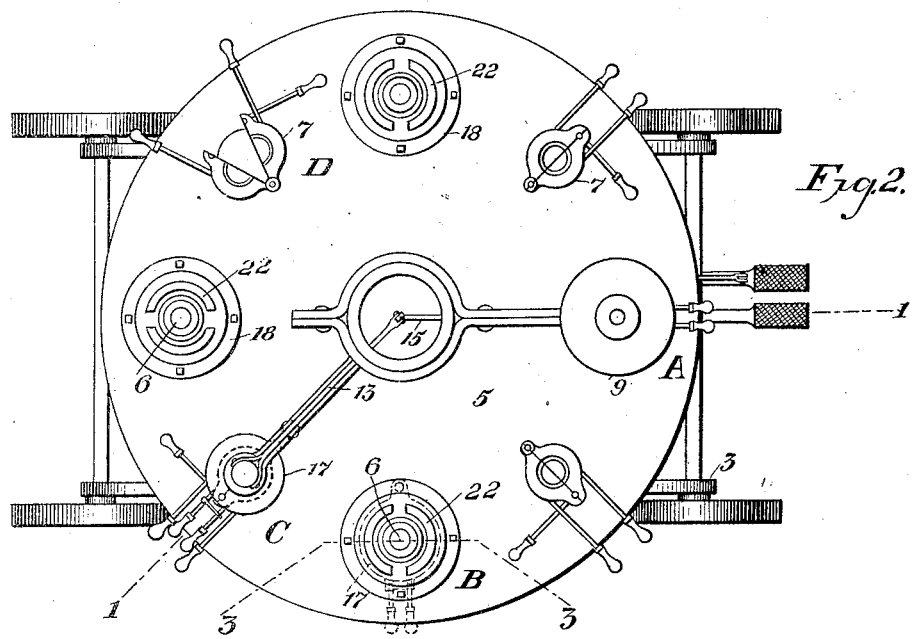
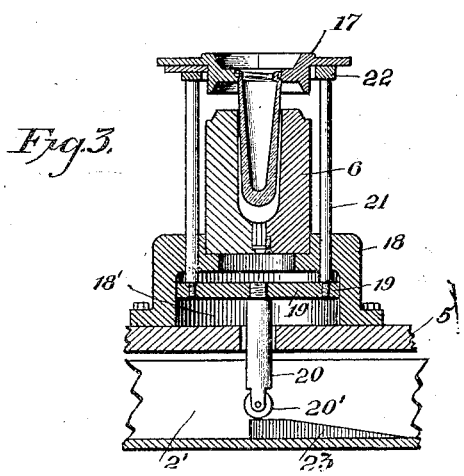
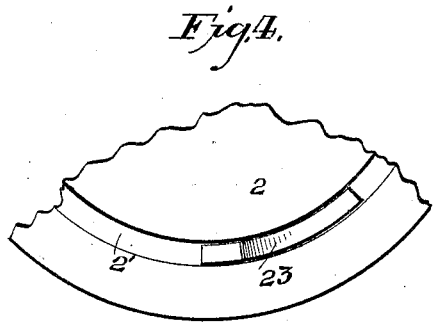
WITNESSES
INVENTOR

UNITED STATES PATENT OFFICE.

THOMAS J. McELHERRON, OF ALTON, ILLINOIS, ASSIGNOR TO SALEM GLASS WORKS, OF SALEM, NEW JERSEY, A CORPORATION OF NEW JERSEY.

APPARATUS FOR MANUFACTURING GLASSWARE.

No. 822,623.

Specification of Letters Patent.

Patented June 5, 1906.

Application filed April 24, 1905. Serial No. 257,023.

*To all whom it may concern:*

Be it known that I, THOMAS J. McELHERRON, a citizen of the United States, residing at Alton, in the county of Madison and State of Illinois, have invented certain new and useful Improvements in Apparatus for Manufacturing Glassware, of which the following is a specification, reference being had therein to the accompanying drawings.

This invention relates to the manufacture of glassware, and has particular reference to that type of machines wherein the plastic glass is first pressed into a hollow blank, which properly shapes the glass for the blowing operation and also for forming the upper portion or neck of the article, after which the blank is transferred to a blow-mold and the article completed by blowing.

The pressing or blank-forming operation forces the glass tightly and compactly into the press or blank-forming mold, thus imparting the shape of the mold to the exterior of the blank and the shape of the pressing-plunger to its interior. At the same time the glass is caused to flow toward and take the shape of a detachable neck-forming mold or neck-ring resting on and forming an upward continuation of the press or blank mold. The upper portion or neck of the article is thus given its finished form, the familiar screw-threaded top or neck of a Mason fruit-jar being an example of such formation. The pressed blank is thus caused to adhere to the neck mold or ring, so that the latter is utilized as a lifting means for transferring the pressed blank to the blow-mold, the neck mold or ring coöperating with the press and blow molds in like manner.

In those machines in which the press and blow molds are separate and distinct it is the present practice to lift the neck-ring by hand from the blow-mold and transfer it, together with the pressed blank depending therefrom, to the blow-mold. This operation usually takes place as soon as the pressing-plunger has receded sufficiently to permit of the removal of the neck-mold. The highly-heated and plastic glass has a tendency to stick in the blank-mold, and in thus resisting the sudden upward hand-lift is liable to become distorted, and especially so if the lift is made carelessly or not in a true upward direction. Thin places in the blank are by such sudden or inaccurate movements made thinner or develop into complete ruptures, and for the same reason the proper distribution of the glass in the blank, including that portion forming the pressed neck, is not infrequently disturbed. Furthermore, the sticking of the glass and consequent resistance to removal renders the hand lifting operation arduous. To overcome these objections to and deficiencies in the operation of machines of the character referred to, I have provided for mechanically starting or lifting the neck-ring and pressed blank from the press-mold, such operation being so timed after the pressing operation as to enable the blank to thoroughly reheat itself within the press-mold, thereby counteracting any chilling effect which the metal of the mold or pressing-plunger may have had thereon, and thus so conditioning the blank that under the gradual and accurate mechanical upward-lifting operation the glass will disengage the mold without disturbing its proper distribution in the blank. Moreover, with the blank thus started from the press-mold the neck mold or ring may be transferred quickly and without effort to the blow-mold for the final blowing operation.

In the accompanying drawings, Figure 1 is a vertical sectional view of apparatus constructed in accordance with my invention, the section being taken on line 1 1 of Fig. 2. Fig. 2 is a top plan view. Fig. 3 is a vertical sectional view, enlarged, taken on line 3 3 of Fig. 2. Fig. 4 is a view of a portion of the machine-base.

Referring to the drawings, 2 designates the machine-base, which may be supported in any suitable manner, being here shown mounted on a truck 3 of usual form. Rising from base 2 is post 4, which is preferably tubular, and rotatable on base 2 around this post is the mold-table 5, carrying the circular series of press or blank molds 6 and blow-molds 7, arranged alternately.

8 designates the plunger mechanism, 9 the cylinder for operating the plunger in usual manner, and 10 the valve mechanism for controlling the movement of the piston (not shown) within the cylinder. The vertical movable blowing-head 11, of usual and well-known construction, is mounted in bracket 12, projecting from post 4, and may be operated by lever 13 connected thereto and fulcrumed between its ends and projecting into the hollow post, where it unites with vertical link 14, connected to treadle 15, whereby the blowing-head may be lowered for the blowing operation as required, the head being held normally raised by spring 16. The pressing and blowing mechanisms may be of the usual or any preferred construction, the structural details of these portions of the apparatus forming no part of the invention.

Fitting the press and blow molds interchangeably are the neck-molds 17, which are so formed as to project over or beyond the press-molds, whereby they may be engaged by the lifting mechanism, which I will now describe. Each of press-molds 6 is preferably mounted on a raised base or stand 18, secured to table 5 and which forms a chamber or space 18' immediately beneath the mold, and within this space is a head 19, which is secured to the upper end of a stem 20, depending through an aperture in the table and into the circular depressed trackway 2' of base 2, stem 20 being preferably provided at its lower end with antifriction-roller 20'. Rods 21 project upward from head 19 and at their upper ends carry the segmental plates 22, which are beneath or in line with the overhanging portion of the neck-mold when the latter is in position on the blow-mold.

Normally the lifting device is in lowered position, as seen in Fig. 1, and in no wise disturbs the proper relative positions of the press and neck molds. This lowered position is maintained during the pressing operation, at which time one of the press-molds is at pressing position or station A, and the arrangement is preferably such that at the same time a blow-mold is in blowing position C, as shown in Figs. 1 and 2. After the pressing operation has been completed and the plunger withdrawn the table is so turned as to place the then active press-mold carrying the neck-mold and freshly-pressed blank to position B. As this position is approached stem 20 rides upward on an incline 23, placed in the bottom of trackway 2'; thereby elevating head 19 and plates 22 and causing the latter to lift the neck-mold upward or away from the press-mold, as clearly shown in Fig. 3. This movement is accomplished gradually, or at least not with the suddenness which attends a manual lift, and the lift is in an accurate or straight upward direction, whereby the blank is disengaged from the interior of the press-mold without injury thereto, and with the neck-mold and blank thus started or lifted they may be readily transferred by hand to the blow-mold at position C, and by the present adaptation an article may be completed at said position by blowing while another article is being pressed at position A. At each advance of table 5 a blow-mold carrying a completed article is advanced to position D, where it is removed.

While the pressed blank is momentarily at rest at position A pending the advance of table 5 and while the latter is being advanced there is ample opportunity for the temperature of all portions of the undisturbed pressed blank to become equalized, so that there will be no distorting or thinning tendency when it is started within the press-mold by the gradual and accurate upward movement of the neck-mold, as above described. Furthermore, this reheating or making uniform of the temperature of the glass, combined with the gradual and accurate upward movement thereof, results in the elimination of hair and oil marks and other surface imperfections, which are frequently imparted to the glass, owing to their contact with the walls of the mold.

In those adaptations of the invention wherein both press and blow molds are arranged on the same table or carrier, as herein proposed, it will be understood that the molds may be variously positioned with relation to each other and that their number may be varied as circumstances may permit or require, and as the invention relates primarily to the manipulation of the neck-mold subsequent to the pressing operation and preceding the blowing operation it will be apparent that the press and blow molds may be variously arranged either on or in the same organized machine or in different machines, as may be preferred.

I claim—

1. The combination of a carrier, a mold mounted thereon and adapted to be moved thereby toward and from a forming position, a lifting device movable with the carrier and mold, and means coöperating with said device for raising the article in the mold as the latter passes from the forming position.

2. The combination of a horizontally-movable carrier, a mold mounted thereon, vertically-movable forming mechanism above the path of movement of the mold, a lifting device mounted on the carrier and positioned adjacent the mold, and means coöperating with said device for raising the article in the mold after the latter passes from beneath the forming mechanism.

3. The combination of a carrier, a mold mounted thereon, a removable neck-mold, and a lifting device mounted on the carrier and adapted to removably engage the neck-mold.

4. The combination of a support, a mold, a detachable neck-mold, and a lifting device operated from below for removably engaging and elevating the neck-mold.

5. The combination of a mold-carrier, a press-mold mounted thereon, a neck-mold adapted to form an upward continuation of the press-mold, vertically-movable mechanism mounted on the carrier for elevating the neck-mold, and a fixed incline over which said mechanism is moved and which operates to raise the same.

6. The combination of a carrier, a press-mold mounted thereon, a neck-mold adapted to form an upward continuation of the press-mold, vertically-movable mechanism mounted on the carrier for elevating the neck-mold, said mechanism having a stem depending through the carrier, and a trackway beneath the carrier provided with an incline over which said stem is moved for raising the elevating mechanism.

7. The combination of a carrier, a support secured to the carrier with a space between the support and carrier, a press-mold mounted on the support, a neck-mold adapted to form an upward continuation of the press-mold, a head movable vertically in the space beneath said support, rests projecting upward from the head and adapted to engage the neck-mold, a stem depending from said head through the carrier, and a fixed incline beneath the carrier over which the stem is moved for raising said head and thereby elevating the neck-mold.

In testimony whereof I affix my signature in presence of two witnesses.

THOMAS J. McELHERRON.

Witnesses:
JOHN T. RYAN,
WILLIAM E. HUBBELL.